Figure 1:
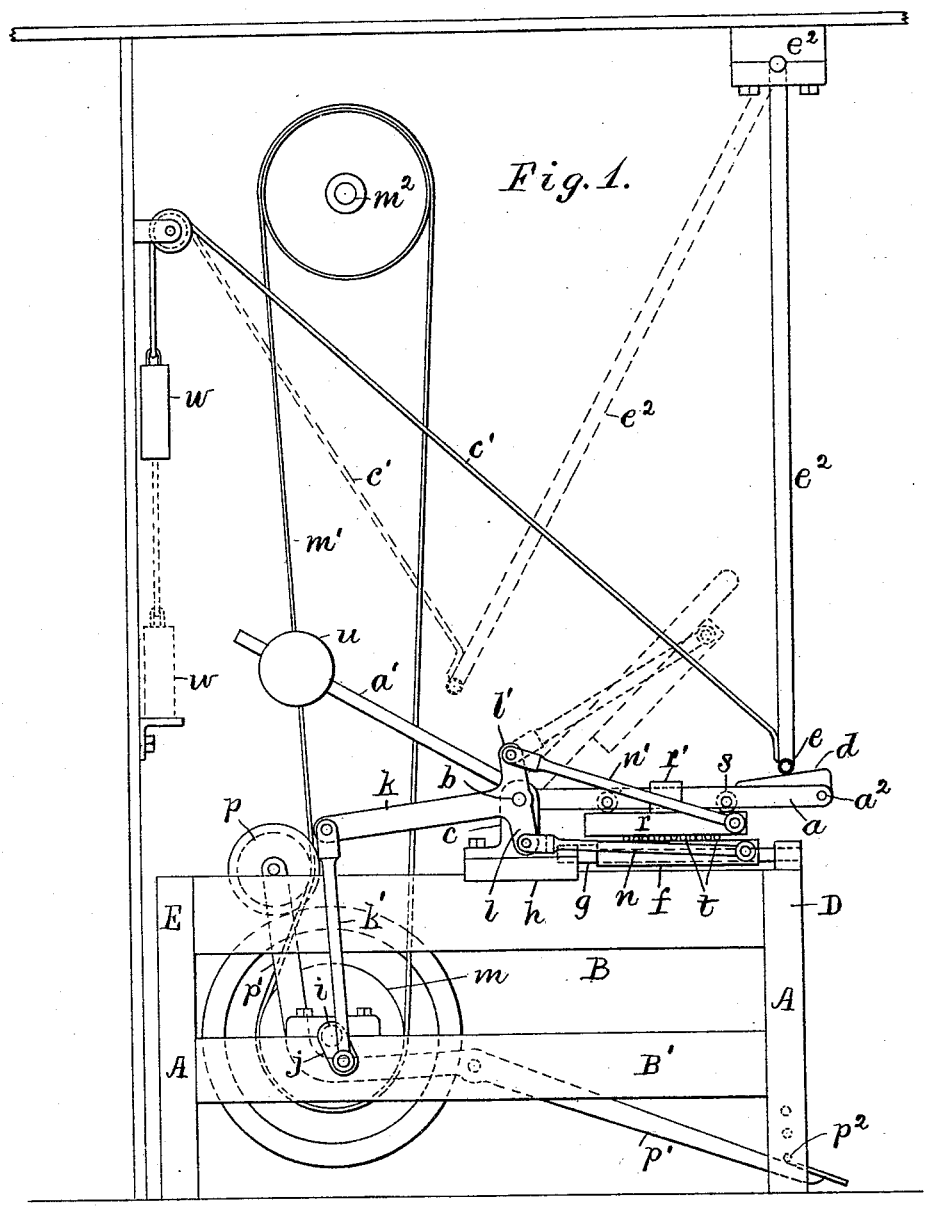

(No Model.)  3 Sheets—Sheet 1.

J. L. CRISP.
BELT ROLLING MACHINE.

No. 452,748. Patented May 19, 1891.

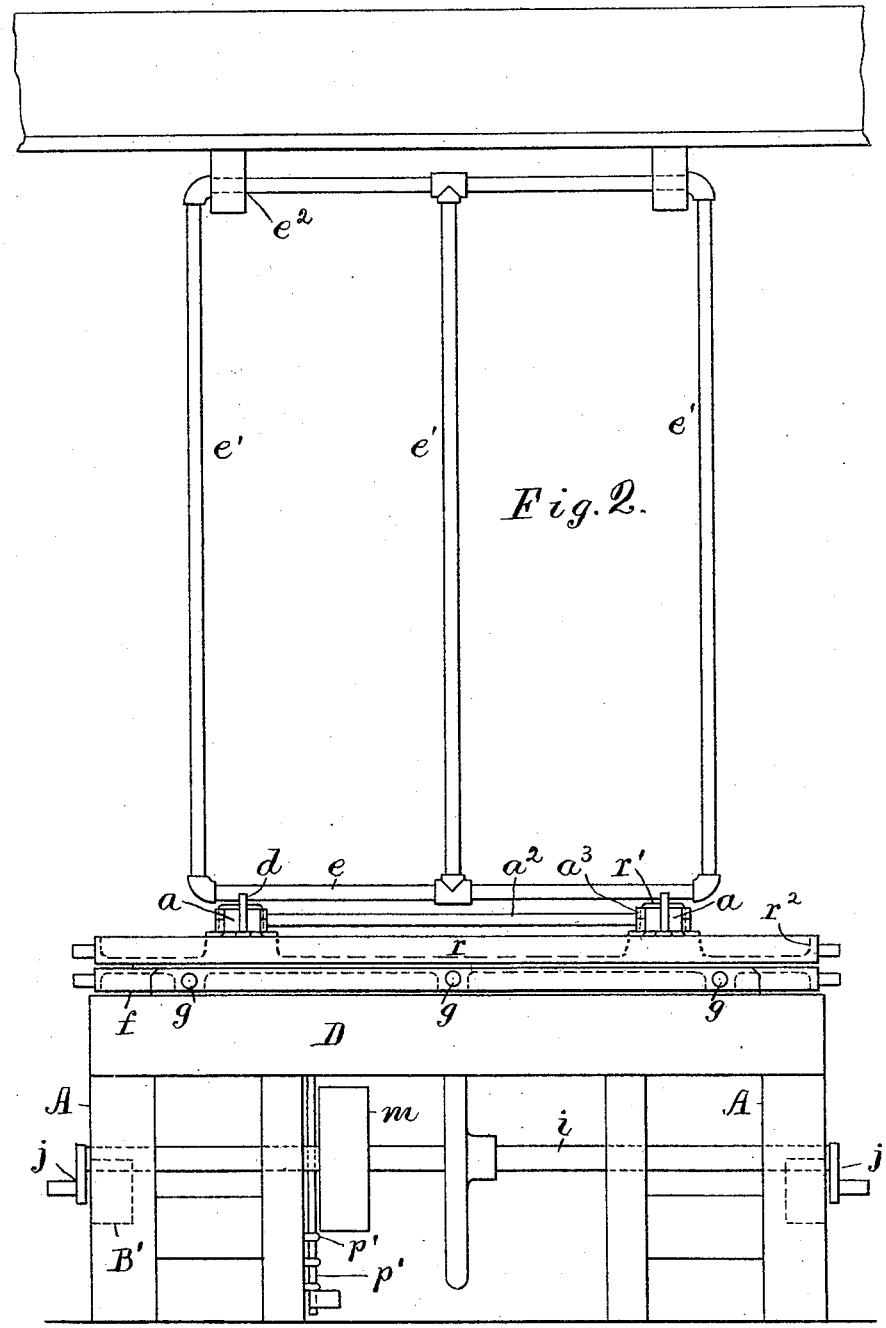

(No Model.) 3 Sheets—Sheet 3.
J. L. CRISP.
BELT ROLLING MACHINE.
No. 452,748. Patented May 19, 1891.
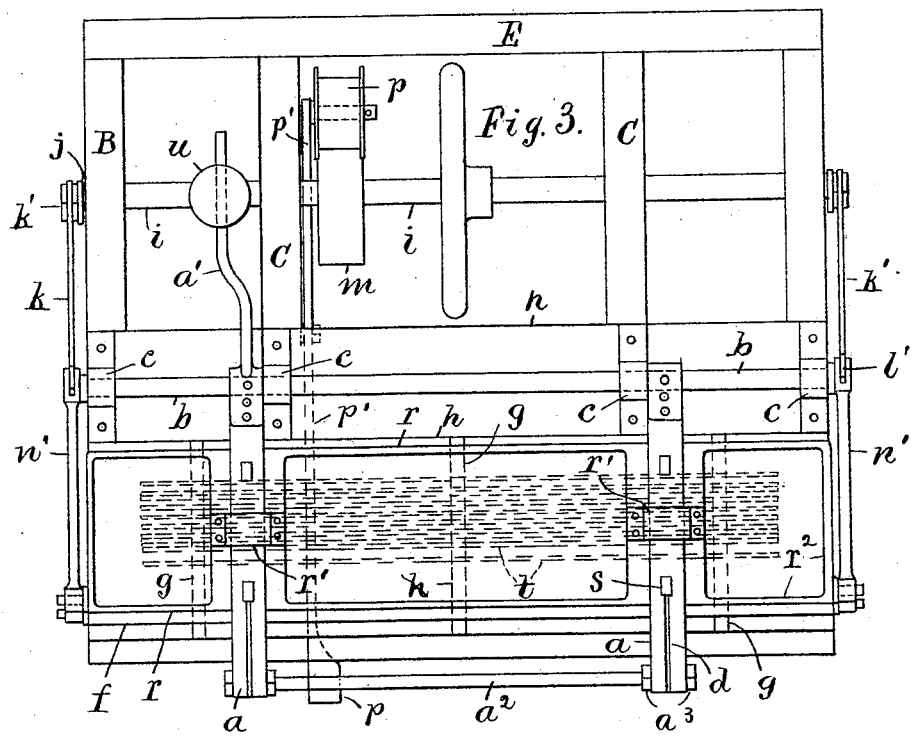
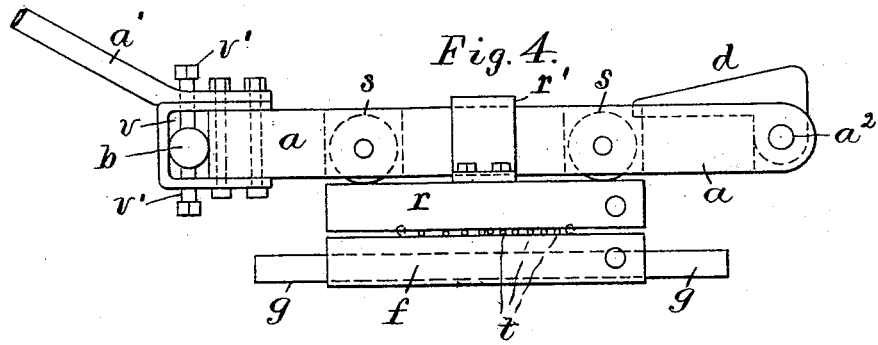
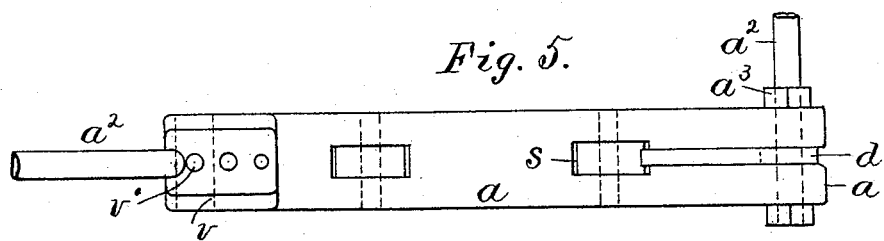
Attest:
L. Lee.
J. Van Wert Jr.
Inventor.
J. L. Crisp, per
Crane & Miller, Attys.

UNITED STATES PATENT OFFICE.

JAMES L. CRISP, OF BLOOMFIELD, NEW JERSEY, ASSIGNOR OF TWO-THIRDS TO FREDERICK J. HALL AND JAMES W. CRISP, OF SAME PLACE.

BELT-ROLLING MACHINE.

SPECIFICATION forming part of Letters Patent No. 452,748, dated May 19, 1891.

Application filed February 18, 1891. Serial No. 381,906. (No model.)

*To all whom it may concern:*

Be it known that I, JAMES L. CRISP, a citizen of the United States, residing at Bloomfield, Essex county, New Jersey, have invented certain new and useful Improvements in Belt-Rolling Machines, fully described and represented in the following specification and the accompanying drawings, forming a part of the same.

The object of this invention is to replace hand-labor by machinery in the rolling of round leather belting, and the invention comprising an oblong bed upon which the belting can be laid, and a flat oblong rubber mounted movably upon arms hinged at the rear of the bed, with means for reciprocating the bed and rubber transversely in opposite directions. By mounting the rubber upon arms which are hinged at their rear ends, I am enabled to tip the rubber upward at a considerable angle with the bed, so as to permit a very free access to the latter in arranging the belts thereon. Heretofore in machines for rolling whip-buttons a runner with semi-cylindrical grooves formed lengthwise therein has been fitted to slide lengthwise upon a single arm and pressed upon a grooved bed by means of a treadle. In machines for rolling whips which are of tapering or conical form a table pivoted at one end and vibrated transversely at the other end has been mounted above a vertically-movable bed, which could be lowered to insert and remove the whips; but in such machines the bed is not vibrated at all. My invention differs from both these classes of machines in having a bed and rubber, both reciprocated transversely to one another by mechanism applied at both their opposite ends, and the rubber mounted upon arms hinged upon their rear ends, so that the rubber may be raised into an inclined position above the bed, by which construction the bed may be much more effectively exposed than by adjusting it vertically, as in the whip-rolling machines heretofore used.

My machine is intended to operate upon a considerable number of round leather belts at once, and no economy would be found in the working of such a machine unless the rubber could be easily removed from above the bed, so that the bed could be plainly seen and the belts inserted in the machine and moved therefrom with great facility.

The annexed drawings represent a machine having a bed and rubber each six feet in length, and thus adapted for finishing at a single operation the round belts used upon sewing-machines, which are between five and six feet in length.

Figure 1 is an end elevation of the machine; Fig. 2, a front elevation without the reciprocating devices; Fig. 3, a plan upon a larger scale than the other figures. Fig. 4 is an edge view, and Fig. 5 a plan, of one of the arms sustaining the rubber.

The frame of the machine is shown of wood, with posts A, end beams B and B', intermediate beams C, front beams D, and rear beam E. The bed $f$ is mounted movably upon ways consisting in three rods $g$, which are mounted transversely over the front of the frame with their rear ends inserted in a longitudinal plank $h$. A shaft $b$ is mounted in bearings $c$ upon the plank and the rubber $r$ is secured movably by straps $r'$ to arms $a$, which are pivoted upon the shaft $b$. The bed $f$, the plank $h$, and the shaft $b$ extend transversely to the beams B and C. The arms are provided near their front ends with wedges $d$, upon which a clamp $e$ is pressed to hold the rubber down upon the bed, and levers $a'$, secured to the rear ends of the arms, are provided with balance-weights $u$ to counterbalance the weight of the rubber. The clamp is shown as a rod hinged by two arms $e'$ to a pivotal bearing $e^2$, attached to the ceiling above the machine. The clamp is drawn normally backward out of the way by a cord $c'$ and a weight $w$. A shaft $i$ is journaled upon the beams B', and provided at opposite ends with cranks $j$. A double-armed lever $k$ is pivoted upon the shaft $b$ at each end of the machine, and connected by a rod $k'$ with the crank $j$. The arms $l\ l'$ of the lever $k$ are connected by links $n$ and $n'$ with the bed and rubber, respectively, and operate to reciprocate them in opposite directions when the shaft $i$ is revolved. The shaft $i$ is driven by a pulley $m$ and a belt $m'$ from a shaft and pulley $m^2$ above the machine, and a tightener-pulley $p$, mounted upon a treadle-lever $p'$, is provided to press the belt upon the pulley $m$ at pleasure.

The bed and rubber are made of rigid materials, as slate or iron, and formed with their adjacent surfaces perfectly flat, and the round belts $t$ are laid upon the bed and are smoothed, hardened, and straightened by pressure and rolling beneath the vibrating rubber.

In Fig. 1 the parts are all shown in full lines in their operative position, with the tightener-lever $p'$ locked beneath a pin $p^2$, which is provided in one of the front posts A. The clamp-rod $e$ is shown jammed upon the wedges $d$ to press the rubber toward the bed $f$, and rolls $s$ are shown pivoted in the arms $a$ to diminish the friction of the rubber as it is vibrated beneath the arms.

Heretofore round belts have been rolled between plane surfaces by holding a board in the hands and rolling the belts therewith upon a flat bed; but no operator is capable of exerting sufficient pressure to actuate a long rubber, and to thus finish anything more than a short portion of the belt at once. It has therefore been common to smooth and harden such belts and to size them by drawing them through a hole in the gage-plate; but the tension required to draw them through a gage-plate stretches the belt at various points, and by diminishing its diameter prevents the gage-plate from polishing the belt and finishing it to the desired degree.

I have found that with a perfectly flat bed and rubber of smooth cast-iron I can finish ten or twelve belts at once, as indicated by the dotted lines $t$, in Fig. 3, and that such belts are much smoother and straighter and have a better surface than the belts finished by a gage-plate.

When the belts are finished, the clamp is pushed backward to the position indicated by dotted lines in Fig. 1, and the arms $a$ are then raised about forty-five degrees, as shown in dotted lines, the weight of the rubber being counterbalanced by the weights $u$, and thus held in an elevated position, with the bed fully exposed to remove the belts $t$ and supply a fresh charge. The rubber is then brought down upon the belts and the desired pressure is produced by drawing the clamp-rod forward upon the wedges $d$ with the required force. The wedges, as shown in Figs. 4 and 5, are fitted to stand the pressure without great thickness or weight by forming them of thin plates inserted edgewise in the top of the arms $a$, and providing each with a lug $d'$, which is fitted to a cross-bar $a^2$, inserted through the arms. The cross-bar furnishes a convenient means of lifting the two arms and the rubber simultaneously, being locked to the two arms by nuts $a^3$. It will be noticed that the clamp when pressed upon the front ends of the arms operates to lock them fast, so as to hold the rubber down upon the bed automatically during the operation of the machine. The operator is thus free to perform other duties during the rolling of the belts, and may prepare the belts which shall be subsequently inserted between the rubber and bed.

As solid round belts vary in diameter from three-sixteenths to three-eighths of an inch, it is desirable at times to adjust the fulcrum of the arms $a$ upon the shaft $b$ to bring the rolls $s$ into an even bearing with the rubber $r$ near its front and rear edges. The means of adjustment is shown in Figs. 4 and 5, Fig. 4 showing the rubber in contact with belts of the smallest size, and several larger belts being shown in dotted lines, which indicate the necessity of raising the arm parallel for operating evenly upon such belts. To effect such adjustment, each arm is provided at its rear end with a strap, which forms a socket $v$ above and below the shaft $b$, and set-screws $v'$ are inserted through the strap against the top and bottom of the shaft to set the arm vertically in relation thereto. The arms are thus rendered adjustable at the pivot whenever it is necessary, by reason of a change in the diameter of the belts, to set the rubber vertically to and from the bed.

By the means described the charge or batch of belts may be finished in two or three minutes, while it would take an operator many times longer to roll the belts by hand and the work would be less perfectly done.

The tightener for stopping and starting the machine may be replaced by any suitable clutch, as is already well known, as either would effect the same result—namely, of starting and stopping the machine quickly to avoid loss of time.

In stopping the machine the operator pushes the treadle $p$ laterally to disengage it from the pin $p^2$, and the weight of the tightener-pulley $p$ then operates to clear it from the belt $m'$.

By inspection of Fig. 1 it will be seen that the link $n'$ stands at a considerable angle to the plane surface of the rubber $r$; but this arises merely from the lever $k$ being pivoted upon the same shaft as the arms $a$, and is not found to operate inconveniently in practice, as the distribution of a batch of belts between the bed and rubber holds the same parallel to one another, while the pressure of the rollers $s$ upon the front and rear sides of the rubber tends also to hold the same parallel with the bed $f$.

It is obvious that the double-armed lever which imparts the vibrating motion in an opposite direction to the bed and rubber may be pivoted in such a position that the link $n'$ would operate more nearly in line with the rubber; but I do not make an exclusive claim to such mechanism, as the double-armed lever has been used for similar purposes heretofore.

The rubber shown in Figs. 1 and 3 consists in an iron plate with ribs $r^2$ upon its upper side to stiffen it, and the bed and rubber when thus constructed may be made of the same pattern.

The arms $a$ are shown in the drawings as if constructed of wood, with the rollers $s'$ inserted in slots, and the wedge $d$ fitted upon the wood to receive the pressure and wear of the clamp-rod $e$; but the arms may be made of any desirable material and the clamp hinged and operated in any suitable manner to affect the required result.

Having thus set forth the nature of my invention, what I claim herein is—

1. A machine adapted for rolling cylindrical belts, comprising an oblong bed supported movably upon transverse parallel ways, two or more arms projected over the bed and pivoted at their rear ends, an oblong rubber supported movably upon the arms transverse to the same, vibrating links attached to both ends of the bed and rubber for reciprocating them simultaneously in opposite directions in parallel lines, and a clamp pivoted to swing transversely to the rubber and arranged and operated to press upon the front end of the arms and to lock the same in their operative position, as and for the purpose set forth.

2. A machine adapted for rolling cylindrical belts, comprising an oblong bed supported movably upon transverse parallel ways, two or more arms projected over the bed and pivoted at their rear ends, an oblong rubber supported movably upon the arms transverse to the same, vibrating links attached to both ends of the bed and rubber for reciprocating them simultaneously in opposite directions in parallel lines, and screws for adjusting the arms vertically upon their pivots to set the rubber vertically to and from the bed, substantially as herein set forth.

3. A machine adapted for rolling cylindrical belts, consisting in the bed $f$, the transverse parallel ways supporting the same movably, the arms $a$, pivoted at their rear ends and provided with balance-weights in the rear of the pivots, the rubber $r$, secured movably upon the arms by straps $r'$, and a clamp for holding the front end of the rubber down upon the bed, and means for reciprocating the bed and rubber transversely in opposite directions, substantially as set forth.

4. A machine adapted for rolling cylindrical belts, consisting in the bed $f$, the transverse parallel ways supporting the same movably, the arms $a$, pivoted at their rear ends and provided with balance-weights in the rear of the pivots, the rubber $r$, secured movably upon the arms by straps $r'$, the wedges $d$ upon the front end of the arms, and the clamp pivoted above the arms and provided with the cord $c^2$ and weight $w$ to hold the clamp normally backward, and means for reciprocating the bed and rubber transversely in opposite directions, substantially as herein set forth.

5. A machine adapted for rolling cylindrical belts, comprising the beams B, the bed $f$, supported transversely to the beams, the shaft $b$, mounted transversely to the beams in the rear of the bed, the arms $a$, pivoted upon the shaft, the rubber $r$, secured movably upon the arms, the levers $k$, pivoted upon each end of the shaft $b$, and provided with double arms linked, respectively, to the bed and rubber, and means for reciprocating the lever, as and for the purpose set forth.

6. A machine adapted for rolling cylindrical belts, consisting in the posts A, end beams B B', intermediate beams C, and front and rear beams D and E, the bed $f$, and shaft $b$, mounted transverse to the beams B, the arms $a$, pivoted upon the shaft $b$, and the rubber $r$, secured movably thereon, the driving-shaft $i$, journaled upon the beams B' and provided at its opposite ends with cranks $j$, the double-armed levers $k$, pivoted upon the shaft $b$ and connected with the bed and rubber by the links $n$ and $n'$, the pulley $m$ upon the shaft $i$, and the treadle-lever $p'$, provided with tightening-pulley $p$ adjacent to the pulley $m$, the whole arranged and operated substantially as herein set forth.

In testimony whereof I have hereunto set my hand in the presence of two subscribing witnesses.

JAMES L. CRISP.

Witnesses:
THOS. S. CRANE,
L. LEE.